United States Patent

[11] 3,585,390

| [72] | Inventor | Tadashi Ishikawa<br>9-17, 1-Chrome, Minami-Cho, KoKubunji-shi, Tokyo-to, Japan |
|---|---|---|
| [21] | Appl. No. | 796,699 |
| [22] | Filed | Feb. 5, 1969 |
| [45] | Patented | June 15, 1971 |
| [32] | Priority | Feb. 7, 1968, Apr. 24, 1968, Apr. 24, 1968 |
| [33] | | Japan |
| [31] | | 43/7116, 43/27105 and 43/27106 |

[54] ZIRCONIA CERAMICS AND INFRARED RAY RADIATION ELEMENTS UTILIZING THE SAME
5 Claims, 8 Drawing Figs.

[52] U.S. Cl. .................................................. 250/84,
106/57/, 219/354;553, 250/85;88
[51] Int. Cl. ...................................................... G21h 5/00
[50] Field of Search ........................................... 250/84, 85,
88; 219/354, 553; 106/57

[56] References Cited
UNITED STATES PATENTS

| 2,658,984 | 11/1953 | Mohn ........................... | 219/354 |
| 3,131,073 | 4/1964 | Long ............................ | 106/57 |
| 3,196,253 | 7/1965 | Jepson et al. ................. | 219/553 |
| 3,425,851 | 2/1969 | Plumat et al. ................. | 106/57 |

Primary Examiner—Archie R. Borchelt
Attorney—Waters, Roditi, Schwartz & Nissen

ABSTRACT: Black zirconia ceramics are prepared by firing a mixture containing more than 45 percent, by weight, of a $ZrO_2 \cdot SiO_2$ component, up to 25 percent, by weight of a mineralizer consisting of manganese oxide, at least one of oxides of iron, cobalt, nickel or chromium, and the balance of clay. The fired black zirconia ceramics emit a large quantity of infrared rays of long wavelength when heated to about 500° C., and are suitable to effect, heating, baking, cooking, drying, etc.

PATENTED JUN15 1971  3,585,390

ZIRCONIA CERAMICS AND INFRARED RAY RADIATION ELEMENTS UTILIZING THE SAME

BACKGROUND OF THE INVENTION

This invention relates to a method of manufacturing ceramics of the zirconia series and infrared ray heating apparatus utilizing such ceramics.

Owing to high heating efficiencies and medical effects of infrared rays, they have been utilized in various fields including electric or gas heaters, dryers, medical instruments, and infrared ray lamps. Like ordinary incandescent lamps, infrared ray lamps utilize tungsten filaments, and in order to increase the energy of longer wavelengths, the operating temperature of tungsten filaments is decreased to about 1,800° 2,500° K. The glass bulbs are made of glasses of a composition that does not absorb heat rays or red-colored glass to absorb visible light rays. Sometimes, reflectors are disposed in bulbs to concentrate radiant rays. For these reasons, infrared ray lamps are more bulky and more liable to be damaged than conventional incandescent lamps.

In a reflection-type electric stove a helical electric heating element is disposed in a quartz tube. Although such a quartz tube emits pink rays and appears very warm and comfortable, actually, no infrared rays are emitted.

As one type of city-gas stove, the so-called Schwank's infrared ray stoves have been developed. In this type, a plurality of fine perforations are provided perpendicularly through the surface of a hot plate which is mounted on one side of a combustion chamber. A flame produced by the combustion of gas in the combustion chamber flows outwardly through said fine perforations to heat the hot plate so as to cause it to emit a large quantity of infrared rays. While this type of infrared ray gas stove is satisfactory, in some installations it is not possible to easily obtain city gas as electric power. Moreover, the efficiency of the stove is greatly influenced by the pressure of gas, and there is the danger of poisoning in case of incomplete combustion or misfire. Accordingly, application of this type of hot plate is generally limited to household use.

On the other hand, ceramics of zirconia series have been developed for use as refractories or heat resistant ceramics. For example zirconia ceramics or refractories essentially consisting of $ZrO_2 \cdot SiO_2$ are characterized by their excellent heat conductivity and resistance against quick heating and quenching.

Although prior art ceramics of the zirconia series have excellent properties, their heat conductivity, hardness and bending strength are not always satisfactory. In addition, prior art ceramics of zirconia series were mainly used in applications where their heat-resistant and corrosion-resistant properties are important.

SUMMARY OF THE INVENTION

I have now discovered that zirconia ceramics incorporated with oxides of manganese as a mineralizer have excellent mechanical properties and can emanate infrared rays of long wavelength.

The method of manufacturing black zirconia ceramics of this invention comprises the step of firing a mixture containing more than 45 percent by weight of $ZrO_2 \cdot SiO_2$ component, up to 25 percent by weight of a mineralizer consisting of manganese oxide, at least one member selected from the group consisting of oxides of iron, cobalt, nickel and chromium, and the balance of clay, at least the vitrification temperature of the mixture.

Prior art zirconia ceramics were generally white or yellow but the novel ceramics of the invention are characterized by their black or greyish black color. Dependent upon the firing conditions, compositions, and other factors, they are black, greyish black, bluish black or grey. For example the ceramics prepared by molding a mixture consisting of 75 percent, by weight, of a powder of $ZrO_2 \cdot SiO_2$, 3.5, percent by weight, of $Fe_2O_3$, 1.5 percent by weight of $Mn_3O_4$ and 20 percent of clay and then firing the molded mixture at a temperature ranging from 1,350° to 1,360° C. are black which is quite different from the appearance of ordinary zirconia ceramics. When compared with ordinary ceramics or white zirconia ceramics, the novel ceramics have higher hardness, bending strength (higher mechanical strength than fused quartz) and wear resistance. While ordinary zirconia ceramics have rather poor heat conductivity, in other words are considered heat insulators, the novel black zirconia ceramics are characterized by their high heat conductivity and small heat storing capacity. Accordingly, the resistance to quick heating and quenching of the novel ceramics is generally excellent, so that they do not deteriorate or crack when subjected to red heat (by Bunsen burner)—quench cycles.

Further, when heated to relatively low temperatures of about 500° C, the novel black zirconia ceramics have a unique characteristic of radiating an abundant quantity of infrared red rays of long wavelength. The wavelengths of the radiated infrared rays are generally more than 5 microns, which is much longer than that of radiations or heat rays emanated from quartz tube heaters or sheathed heaters containing nichrome wires. In addition, the cost of manufacturing the novel ceramic tube is less than ordinary fused quartz tubes. Due to the low cost and long infrared rays the novel ceramics are very suitable for use as various heating elements as will be described hereunder.

The novel zirconia ceramics that can emanate infrared rays of long wavelength are prepared by firing a body mixture of a special composition.

More particularly, the major proportion of the body mixture comprises a $ZrO_2 \cdot SiO_2$ composition. Although $ZrO_2$ and $SiO_2$ may be incorporated independently, it is more convenient and economic to use them in the compound form of $ZrO_2 \cdot SiO_2$ or zircon. The $ZrO_2 \cdot SiO_2$ component is used more than 45 percent, by weight. This quantity is the same when $ZrO_2$ and $SiO_2$ are independently incorporated, in which case the quantity corresponds to the sum of both.

One of the important compositions of the mineralizer utilized in this invention is manganese oxide. Because in the absent of manganese oxide, the resulted product is not blackish sufficient radiant property of the black body can not be realized. However, it is not also suitable to use only manganese oxide as the mineralizer. Because, in this case, only the surface of the products is black. For this reason, as the mineralizer utilized in this invention, it is important to use at least one oxide selected from the group consisting of oxides of iron, cobalt, nickel and chromium together with manganese oxide. By varying the composition of the mineralizer, the color of the resulted ceramics can be varied. Thus for example, where iron oxide is incorporated, as the quantity of iron oxide is increased the products manifest bluish black whereas as the quantity is decreased products manifest brownish black. From the standpoint of economy a mineralizer consisting of manganese oxide and iron oxide is most advantageous, but one or two or more of oxides of other metals may be substituted for the whole or a portion of iron oxide. Although up to 25 percent by weight of the mineralizer may be used, it is preferable to use manganese oxide up to 10 percent, by weight.

The remaining composition of the body mixture is clay. However clay is not the essential composition and the novel ceramics can be prepared by utilizing only the $ZrO_2 \cdot SiO^2$ composition and the mineralizer. But to improve plasticity and moldability of the body mixture it is desirable to use clay.

The body mixture consisting of above-described compositions is then fired according to conventional method. Thus, after adding a suitable quantity of water, the mixture is kneaded, molded, dried and fired. Firing is accomplished by heating the dried body to at least vitrification temperature. Generally, firing temperatures ranging from 1,200° to 1,450°, especially from about 1,280° to 1,380° are preferred. Also the firing operation can be carried out in an ordinary atmosphere utilized in firing ceramics.

Suitable quantities of the body compositions have been disclosed in the foregoing description. Generally speaking, where the quantity of $ZrO_2 \cdot SiO_2$ composition is less than 45 percent, or where clay composition is more than 30 percent, or where the mineralizer is more than 25 percent, the refractoriness decreases and the range of firing temperature becomes narrower, thus resulting in ceramics of poor quality. Within the prescribed range, the firing temperature as well as the operating temperature of the products can be increased by either increasing the $ZrO_2 \cdot SiO_2$ composition, or decreasing clay or mineralizer.

Throughout the specification and claim the quantity of various body compositions is expressed in terms of weight percent based on the total weight of dry mixture.

BRIEF DESCRIPTION OF THE DRAWING

The invention can be more fully understood from the following detailed description when taken in conjunction with the accompanying drawing: in which.

DESCRIPTION OF PREFERRED EMBODIMENTS

Following table shows examples of the composition of the body mixture and their firing temperature.

| Sample number | Composition (percent) | | | | | | | | Firing temp.°C |
|---|---|---|---|---|---|---|---|---|---|
| | $ZrO_2 \cdot SiO_2$ | Clay | $Fe_2O_3$ | $Mn_3O_4$ | $MnO_2$ | CoO | NiO | $Cr_2O_3$ | |
| 1 | 86 | 10 | 2.5 |  | 1.5 |  |  |  | 1,380 |
| 2 | 76 | 20 | 2 | 1 |  | 1 |  |  | 1,360 |
| 3 | 70 | 25 | 2.5 | 0.5 | 0.5 | 0.5 | 0.5 | 0.5 | 1,350 |
| 4 | 71 | 20 | 7 |  | 1.5 | 0.5 |  |  | 1,320 |
| 5 | 68 | 20 | 2 |  | 10.0 |  |  |  | 1,280 |
| 6 | 50 | 30 | 10 |  | 10 |  |  |  | 1,240 |
| 7 | 45 | 30 | 15 | 10 |  |  |  |  | 1,200 |

Some of typical examples of infrared ray heating apparatus utilizing the novel black zirconia ceramics are given hereunder. Since constructions of various electric or gas-heating or -drying apparatus are well known in the art they are shown only diagrammatically to simplify description.

As the zirconia ceramics of the above composition have extremely high electrical resistances at room temperature, of the order of those of electric insulators it is difficult to heat them by directly passing current therethrough. Accordingly they are shaped into pipes, plates or discs and electric or gas heating means are used to heat them to emit infrared rays.

Figure 1:
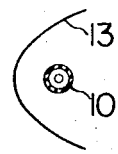
FIG. 1 shows a diagrammatic sectional view of a reflecting electric stove embodying this invention.

FIG. 1 shows a reflection-type electric stove wherein a heating element 10 including a tube 11 of the novel zirconia ceramics and a nichrome wire 12 contained in the tube (FIG. 2) is disposed at the focus of a parabolic reflector 13. When energized with suitable power for example 600 w. to 2 kw. the ceramic tube emanates an abundant quantity of infrared rays. The temperature of the surface of the tube is relatively low, for example about 500° C.

Figure 2:
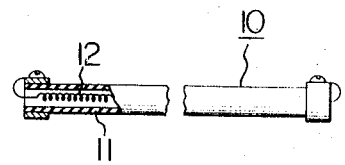
FIG. 2 is a side view, partly in section, of a heating element utilized in the stove shown in FIG. 1.
Figure 3:
FIG. 3 is a sectional view of another type of reflecting heater.

FIG. 3 shows a section of a modified heater wherein an annular heating element having a similar construction as that shown in FIG. 2 is disposed at the focus of an annular parabolic reflecting groove 15 provided on the periphery of a metal disc. Such a heater is suitable for use in Kotatsu (Japanese body and foot warmer).

Figure 4:
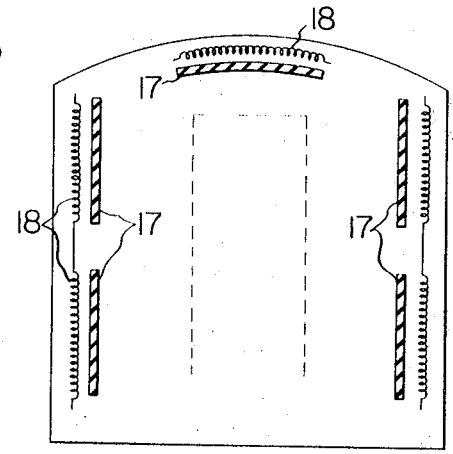
FIG. 4 is a cross-sectional view of a drying apparatus utilizing hot plates of this invention.

FIG. 4 shows a cross section of a tunnel-type drying apparatus in which a plurality of hot plates 17 made of the novel zirconia ceramics and heated by electric heaters 18 are substituted for conventional infrared ray lamps. Such drying apparatus is useful to dry or bake painted articles, fabrics, vegetables, breads, biscuits, crackers and the like. For example, with a drying apparatus of a rated capacity of 18 kw. and having the construction as shown in FIG. 4, the time required for drying painted articles was reduced to one-third of that of the drying apparatus utilizing infrared ray lamps and to one-half when drying clothes. In other words, the required power was reduced to one-third to one-half for the same drying time. This is because that the spectral energy distribution of an infrared ray lamp is generally similar to that of an ordinary gas-filled incandescent lamp. Such a distribution curve has a peak at a wavelength of 1.15 microns and sharply inclines on both sides of the peak. Moreover, as light rays of the wavelength other than the infrared rays are intercepted by the glass wall of the lamp, the heat efficiency of the infrared ray lamp as a drier is at most 20 to 60 percent. In contrast, as the novel ceramics are generally black, they will absorb heat energy impinging thereupon and since they are good heat conductors and stores less heat, nearly all of the heat applied to the rear surface of the ceramic plates is conducted to the front surface and effectively converted into infrared rays.

Likewise in toasters, fish grills, ovens, roasters and the like cooking utensils, heating elements comprising plates or pipes of the novel ceramics and electric- or gas-heating means may be used. Infrared rays, also termed as heat rays have high heating effect and can penetrate into the interior of a material to be heated, this tendency being pronounced as the wavelength of the infrared ray is increased (far infrared rays), thus assuring uniform heating or cooking from inside. Such cooking utensils are also effective to quickly reheat cold meals.

Figure 5:
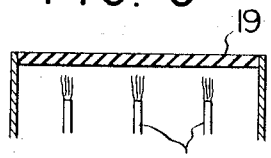
FIG. 5 is a sectional view of a gas heater.

FIG. 5 shows still another modification of this invention in which a hot plate 19 of the novel zirconia ceramics is heated by town gas burners 20 to radiate infrared rays. As has been pointed out before in the prior infrared ray gas stoves, it is necessary to provide numerous fine perforations through the hot plate, but such construction not only increases the cost of manufacture but also involves the danger of poisoning. However, with the hot plate of the novel ceramics, it is not always necessary to provide such fine perforations. This feature is especially advantageous in drying apparatus of large capacity, because a drying or baking chamber and a combustion chamber can be completely partitioned by a wall structure comprised by or including hot plates of the novel ceramics, so that dangerous combustion products can be discharged through a duct without contacting the operator or articles to be treated.

The novel drier is also useful for drying vegetables, bean paste (miso), pastures, or grains. Rice grains are ordinary dried with hot air but it is important to uniformly dry such grains while retaining certain quantity of moisture therein. The novel ceramic hot plate can uniformly dry such grains by availing the penetrating effect of far infrared rays. The drying apparatus may be fabricated as the tunnel type or tank type. I have dried green leaves of various vegetables and found that leaves have dried without changing their color and that when once dried they did not moistened in the open air and retained their dried state.

Figure 6:
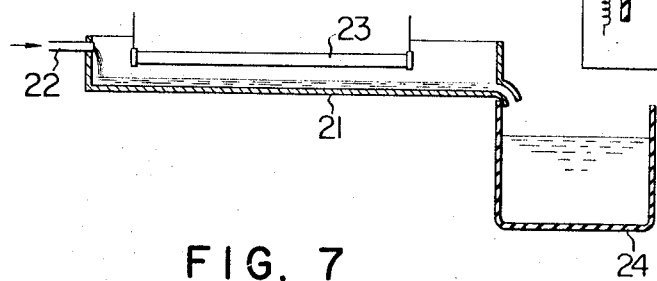
FIG. 6 is a diagram illustrating one application of this invention to activate warm water of hot spring.

I have also obtained following interesting results. In one case, as shown in FIG. 6, while passing through a shallow through 21 warm water of hot spring admitted through a pipe 22 is irradiated with an elongated heating element 23 similarly constructed as that shown in FIG. 2, was heated to 500° C. and disposed above the trough. After heating to about 40° C. to 42° C., the water is poured into a bath tab 24. When used such a bath the skin became red and did not chill after the bath. The bath of hot spring water thus irradiated or activated with infrared rays can be taken even when its temperature is increased to 46° which is too hot for ordinary bath. The reason for these phenomena is not yet clear. In the other case, a dry bath without any lid was prepared, and the novel infrared ray heating elements was installed in the bath. Then the elements were energized by electric wires at a power of 3.2 kw. to raise the temperature of the air in the bath to 50° C. When the bath was taken, severe perspiration occurred within 5 to 10 minutes as a result of inside heating of the body.

It is also necessary to breed chickens and young pigs in warm dark spaces for a certain period. The novel infrared ray heating elements are suitable for such applications. It is possible to design these elements to have wide radiating surfaces to provide uniform heating. Especially when breeding young pigs, several to 10 or more young pigs and a mother pig are housed in a space. With a conventional heating system with an electric heater, for example young pigs tend to crowd in the warm position so that there is a risk of crushing some of them under feet of the mother pig. Such risk can be avoided by using heating elements with wide radiating surfaces.

In addition, the novel infrared heating element can be used to bake conductive paint on the inner surface of cathode ray tubes for use in television receivers. This is because that infrared rays of long wavelength are well absorbed by tube walls so that not only the temperature of the tubes as a whole as well as that of the treating room can be decreased greatly. Further, the novel heating elements are suitable to dry raw fishes, Silica Gel saturated with moisture, to heat treat "Kamaboko" (boiled and shaped fish paste), to heat set synthetic resins (for example socks and the like) to dry and sterilize glass bottles and ampuls and to dry coated electric welding rods. Further the heating elements can be used for medical purposes.

The zirconia ceramics can be formed into pipes, plates or discs and the source of heat may be electric power, town gas or flue gas. Generally speaking, it is possible to emit infrared rays having wavelength longer than 5 microns so long as the surface of the heating element can be heated up to 500° C.

Figure 7:
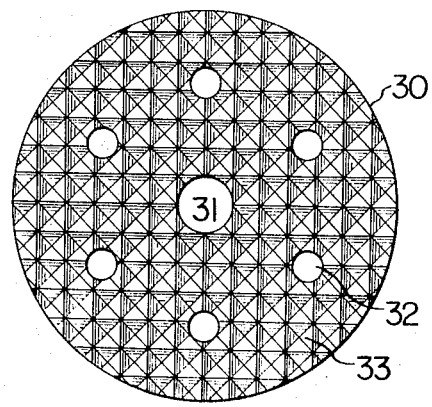
FIG. 7 is a plan view of a infrared ray emitting disc made of the novel zirconia ceramics and FIG. 8 shows a section of a frying pan employing the infrared ray emitting disc shown in FIG. 7.
Figure 8:
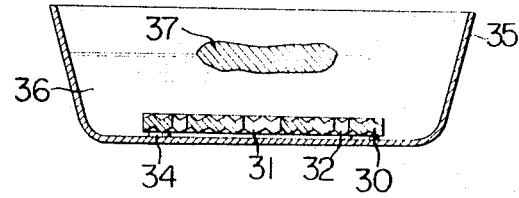

FIGS. 7 and 8 show the application of the novel zirconia ceramics for frying foods. When frying foods, if their thickness is large, it takes long time to thoroughly cook them. In some time the interior portions remain uncooked or outer portions scorched. Further, it is necessary to elevate the temperature of oil or fat to at least 180° C. which causes oxidation of the oil or fat. The infrared ray radiating member made of the novel zirconia ceramics can obviate these difficulties. For example; the infrared radiating member 30 shown in FIG. 7 is a circular disc having an outer diameter of about 12 cm., a thickness of about 5 mm., for example. A central perforation 31 of 15 mm. diameter and several small perforations 32 of 7 mm. diameter are provided. A plurality of depressions 33 are provided on both surfaces of the member to radiate infrared rays in all directions. A plurality of short legs 34 may be provided. To use the infrared red ray radiating member 30, it is put on the inner bottom of the frying pan 35 containing a body of oil (vegetable oil or fat) 36 and a food to be fired 37, and heat is applied to the bottom of the pan.

When used in this manner, the member 30 absorbs heat applied to the pan and emits abundant quantity of infrared rays having wavelength of more than 5 microns, thus rapidly cooking food 37 from inside. When cooking a port cutlet, without using the novel infrared ray radiating member it took about 2 minutes and 15 seconds whereas the cooking time was reduced to only one minute with the novel element. Further, in the former case, it was necessary to heat the oil to 180° C. but in the latter case the temperature may be 170° C. or less. This means that it is able to decrease oxidation of the oil and hence blackening or scorching of the fried food.

Instead of using a disc-shaped member, it may be divided into a plurality of small pellets or cubes.

While only a limited member of applications of the novel infrared ray radiating element has been described, it will be understood that the novel infrared ray radiating element can be used in any applications, where it is necessary to effect heating, drying, baking, firing, curing, cooking and the like by means of infrared rays of long wavelength.

I claim:

1. Fired zirconia ceramics which emit infrared rays longer than $5\mu$ at elevated temperatures, said ceramics containing more than 45 percent by weight of $ZrO_2 \cdot SiO_2$ component, up to 25 percent by weight of a mineralizer consisting of manganese oxide, at least one member selected from the group consisting of the oxides of iron, cobalt, nickel and chromium; the balance being clay, said ceramics being fired at a vitrification temperature.

2. An infrared ray radiating element comprising an infrared ray radiating member made of fired zirconia ceramics containing more than 45 percent by weight of $ZrO_2 \cdot SiO_2$ component, up to 25 percent by weight of a mineralizer consisting of manganese oxide, at least one member selected from the group consisting of the oxides of iron, cobalt, nickel and chromium; the balance being clay; and means for heating said infrared ray radiating member to a temperature at which said infrared ray radiating element will emit infrared rays having wavelengths of more than 5 microns.

3. The infrared ray radiating element according to claim 2 wherein said means for heating is an electric current.

4. The infrared ray radiating element according to claim 2 wherein said means for heating is heated by hot combustion gas.

5 The infrared ray radiating element according to claim 2 wherein said radiating element is in the form of a disc having a plurality of depressions on both surfaces and a plurality of through holes extending between said both surfaces.